(12) United States Patent
Kretschmann et al.

(10) Patent No.: US 6,373,042 B1
(45) Date of Patent: Apr. 16, 2002

(54) REGISTRATION SYSTEM FOR A DIGITAL PRINTER WHICH PRINTS MULTIPLE IMAGES ON A SHEET

(75) Inventors: Deborah M. Kretschmann, Penfield; William D. Milillo, Ontario; Dean Thomas, Webster; Robert Brutovski; John Shannon, both of Penfield; Theodore J. Kellogg; Glenn Herbert, both of Rochester; Thomas C. Hatch, Williamson, all of NY (US)

(73) Assignee: Xerox Corporation, Stamford, CT (US)

( * ) Notice: Subject to any disclaimer, the term of this patent is extended or adjusted under 35 U.S.C. 154(b) by 91 days.

(21) Appl. No.: 09/649,645

(22) Filed: Aug. 29, 2000

(51) Int. Cl.[7] ............................................... H01L 27/00
(52) U.S. Cl. .............................. 250/208.1; 250/559.36; 250/235
(58) Field of Search ............................... 250/208.1, 235, 250/559.36, 559.3, 559.4; 358/488, 496–498; 271/3.06, 3.12, 3.17; 355/53, 55

(56) References Cited

U.S. PATENT DOCUMENTS 6,137,989 A * 10/2000 Quesnel ...................... 399/394

* cited by examiner

Primary Examiner—Que T. Le
(74) Attorney, Agent, or Firm—R. Hutter

(57) ABSTRACT

A printing apparatus places multiple images on a sheet, either by re-feeding the sheet through a duplex path back to a marking device, or by feeding the sheet to successive marking devices. An edge position detector upstream of the marking device determines the location of the sheet so that an image may be precisely placed on the sheet. The system ensures that images on both sides of a sheet are in registration with each other.

20 Claims, 3 Drawing Sheets

REGISTRATION SYSTEM FOR A DIGITAL PRINTER WHICH PRINTS MULTIPLE IMAGES ON A SHEET

Incorporation by Reference

The present specification incorporates by reference U.S. Pat. No. 5,994,711, assigned to the assignee hereof.

FIELD OF THE INVENTION

The present invention relates to office equipment such as printers and copiers, and in particular relates to a system for registering the placement of multiple images on a sheet, such as to print images on both sides of a sheet.

BACKGROUND OF THE INVENTION

Office equipment, such as printers and copiers, which place images based on digital data onto sheets, such as sheets of paper, are well known. More sophisticated types of office equipment are capable of placing images on both sides of a single sheet of paper, a feature often referred to as "duplexing." A typical configuration of a duplexing printer (the word "printer" including other types of equipment, such as digital copiers and facsimile machines) will include a marking device, meaning some hardware which places a desired image on a sheet, which is capable of printing only on one side of the sheet at a time. In order to print on both sides of the same sheet, it is necessary to feed a sheet through the marking device the first time, so the sheet can receive a first image on one side thereof, and then invert the sheet and re-feed it back into the marking device so that the marking device can place a second image on the other side of the sheet. Although the specific architectures of various office equipment on the market varies widely, the path (along with any associated sheet-handling hardware, such as belts or rollers and motors) by which a sheet which has been output by a the marking device is inverted and re-fed to the marking device can be generally referred to as a "duplex path." In the market for office equipment having a duplex features, a common customer requirement is a precise registration between an image printed on one side of the sheet with the image printed on the other side. If a single sheet having a images on both sides a thereof is held up to the light, it is desirable that the margins of the two images, particularly if the images include text, be perfectly superimposed. There is therefore a need to provide a system by which the image placed on one side of a sheet by the marking device is registered with the image on the other side of the sheet.

DESCRIPTION OF THE PRIOR ART

U.S. Pat. No. 4,538,905 discloses a basic system in which a location of the side edge of a sheet being fed is precisely measured, and a position of an image placed on the sheet is thereby adjusted.

U.S. Pat. No. 5,994,711, which is incorporated by reference herein, describes a system, including an optical sensor, for the determining the position of a sheet being fed through a system, such as a copier. This precisely determined location is then used to control the marking device, such as an electrophotographic "laser printer," so that the image can be precisely placed on the sheet in response to the observed position of the sheet entering the marking device. The particular embodiment of this patent shows a preferred system for locating an edge of a sheet being fed, which can take into account of the distance of a sheet from an optical sensor when its position is being determined.

SUMMARY OF THE INVENTION

According to one aspect of the present invention, there is provided a printing apparatus, comprising a marking device, the marking device being capable of placing an image on a sheet fed therein and outputting the sheet; a feed path, for feeding a sheet from a sheet supply to the marking device; and a duplex path, by which a sheet output from the marking device is re-fed to the marking device. A first edge position detector outputs a first edge position signal relating to a location of a side edge of a sheet passing through the feed path, and a second edge position detector outputs a second edge position signal relating to a location of a side edge of a sheet passing through the duplex path. An image placement controller is associated with the marking device and adjusts placement of an image on the sheet in response to at least one of the first edge position signal and the second edge position signal.

According to another aspect of the present invention, there is provided a printing apparatus, comprising a first marking device, the marking device being capable of placing an image on a sheet fed therein, and outputting the sheet, and a second marking device, the marking device being capable of placing an image on a sheet fed therein, and outputting the sheet. A feed path is provided, for feeding a sheet from a sheet supply to the first marking device and then to the second marking device. A first edge position detector, for outputting a first edge position signal relating to a location of a side edge of a sheet passing through the feed path before the first marking device, and second edge position detector outputs a second edge position signal relating to a location of a side edge of a sheet passing through the feed path before the second marking device. An image placement controller is associated with at least one marking device, the image placement controller adjusting placement of an image on the sheet in response to at least one of the first edge position signal and the second edge position signal.

DETAILED DESCRIPTION OF THE INVENTION

Figure 1:
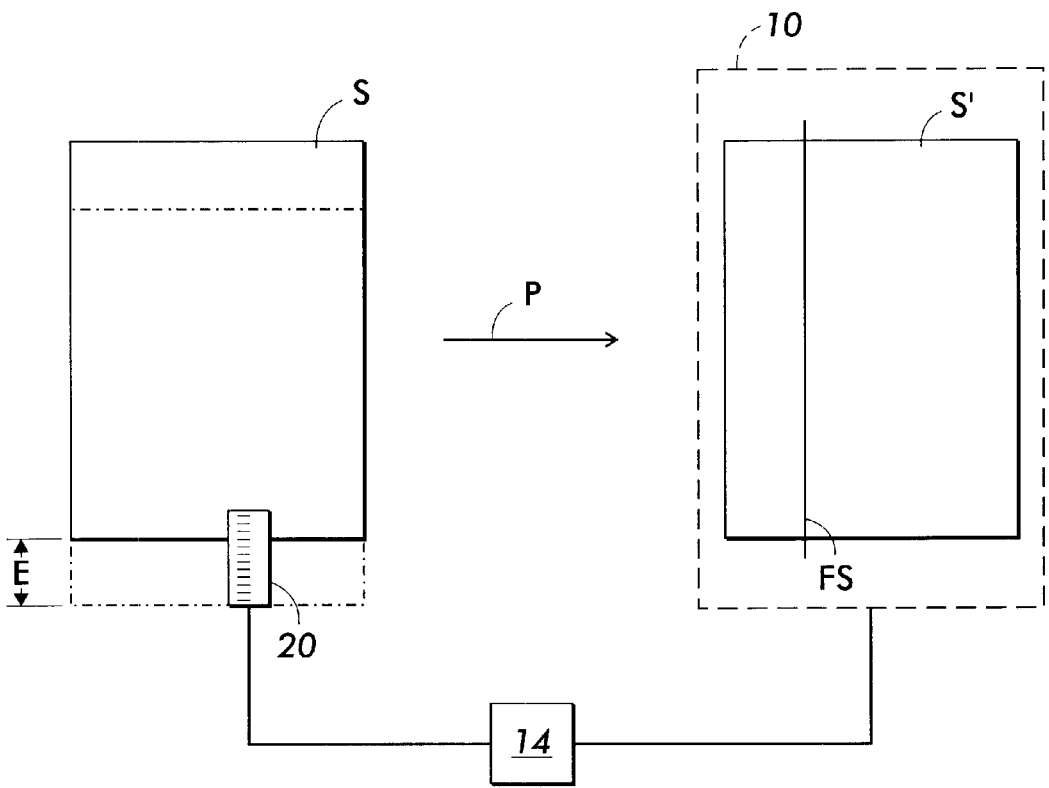
FIG. 1 is a diagram showing the basic principles of edge registration for sheets being fed into marking device, as known in the prior art.

FIG. 1 is a diagram showing the basic principle of edge registration of a sheet within a printer, as used with the present invention. A sheet S is sent through a path in a process direction indicated as P toward a marking device generally indicated as 10. At a short interval before the sheet is fed through marking device 10 to receive an image thereon, the sheet is caused to pass over, in one particular embodiment, an optical sensor 20, which functions, in terms of the claims below, as an "edge position detector." There are many possible designs of an optical (or mechanical) sensor 20 and associated system in the art which are capable of determining the position of the side edge of the sheet, but the preferred embodiment of such a sensor is given in the patent incorporated by reference.

The purpose of optical sensor 20 is to determine the precise location of a "side edge" of the sheet S relative to a fixed point within the printer, such as indicated by the distance E. Consistent with the claims below, as used in the specification herein, the edge of the sheet which runs parallel to the process direction P will be referred to as the "side edge" of the sheet, even if the particular image placed on the sheet causes the "side edge" of the fed sheet to be the top edge or bottom edge relative to the image printed thereon. The optical sensor 20 determines the precise distance E of the edge of the sheet S relative to some fixed point within the machine, and the determination of this distance E is output by a sensor 20 as an "edge position signal," as the term is used in the claims below (such a signal may be in any form, such as a digital number). In brief, the edge position signal from a particular sensor 20 is symbolic of the measured position of a side edge of the sheet being fed through a path in a process direction.

The edge position signal from is then sent to a control system generally indicated as 14, which is referred to in the claims as an "image placement controller," which influences the operation of the marking device 10. Marking device 10 can be of any type known in the art, such as an electrophotographic "laser printer" device, or can alternately be an ink jet printer with a reciprocating printhead, or an ink jet printer with a page with printhead. In the case in which marking device 10 is an electrophotographic device, it is typical that the image desired to be printed, which is originally rendered as digital image data, is ultimately placed on the sheet by means of a narrow laser beam which corresponds to a "fast scan direction" which is perpendicular to process direction P. An electrophotographic marking device 10 can respond to the edge position signal from sensor 20 by coordinating its "start of scan" signal, meaning the precise time at which a leading edge of a raster line in an image to be printed starts to create an image, in order to maintain a precise spacing relative to the location of the edge of a sheet, such as when the sheet is receiving an image at the location marked S'.

In the case of an ink jet marking device with a relatively small printhead which reciprocates along fast scan a direction FS shown in the Figure, the signal from a sensor 28 can be used to determine the exact timing of the beginning of the printhead ejections with each printhead scan, once again to ensure a precise placement of the printed image relative to the edge of the sheet. In the case of an ink jet printer (or equivalent device, such as an ionographic head) which includes a printhead which extends the full width of a page, the edge position signal from sensor 20 can be used to determine the exact subset of the ejectors or ejector equivalents which are used to create the image on the sheet S.

Although the description in FIG. 1 shows the basic case in which the exact location of the edge of a sheet is determined by sensor 20, and the information derived therefrom is used for precise placement of an image on the same sheet when the sheet is passed through the marking device 10, it will be apparent that variations on the basic concept are possible. For example, instead of determining the position of the edge of a particular sheet and thereby adjusting the image placement of the image on that particular sheet, it may be more practical to place an image on a particular sheet based on data about the edge locations of sheets which have been previously fed through the path. For instance, it may be desirable to maintain a running average of the positions of previous sheets which happen fed through the path, and use information from previous sheets for the placement of images on subsequent sheet; this general concept rests on the reasonable assumption that a sheet running through the path at a particular time will behave very similarly to a subsequent sheet moving through the path.

Figure 2:
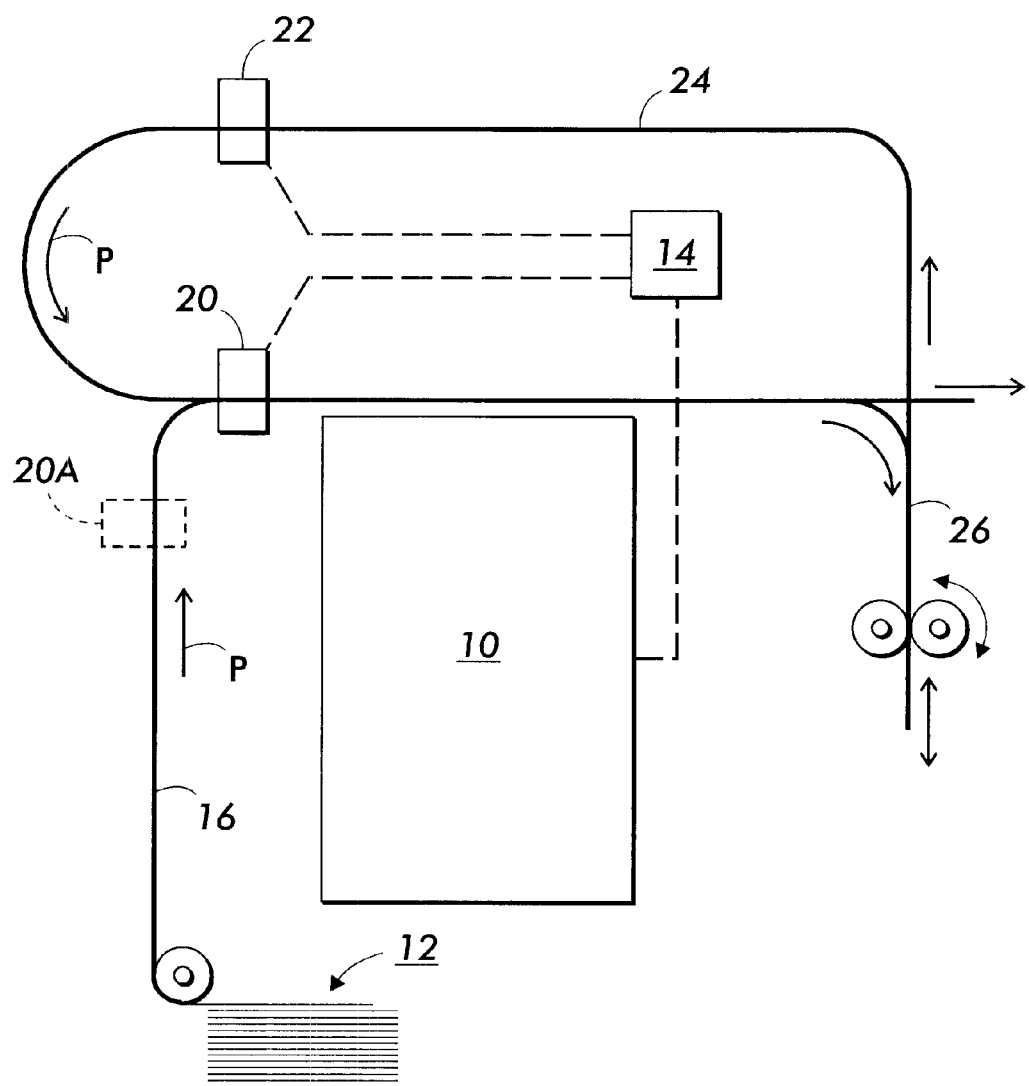
FIG. 2 is a simplified elevational view of the relevant portions of a duplexing printing apparatus, such as a digital printer or copier, having a duplex path, and incorporating the present invention.

FIG. 2 is a simplified elevational view of the relevant portions of a digital printing apparatus, including a duplex path, incorporating the present invention. As in FIG. 1, there is provided a marking device 10, which is, in relevant part, controlled by an image placement controller 14. Sheets on which one or more images are desired to be printed are drawn from a sheet supply stack 12, of a design known in the art, and caused to move through a feed path 16. In addition to a sensor 20 forming an edge position detector, feeding a signal into image placement controller 14, there is provided a second sensor 22 forming a second image position detector. (In the Figure, the sensor 20A represents an alternate location for sensor 20.) The second edge position detector 22 is disposed along a duplex path indicated as 24. Sheets traveling along the feed pass 16 are initially sent through marking device 10 to receive an image on at least one side thereof. For purposes of the claims herein, terms such as "feed path" and "duplex path" are intended to include not only the space defined for passage of sheets therethrough, but also any necessary hardware to cause motion of the sheets for the feed path or duplex path, such as rollers, vacuum transports, belts, diverters, etc. Also, even though the term "duplex path" is used for convenience in some of the claims below, it will be understood that an equivalent of such a duplex path will be apparent in any machine in which a sheet is re-fed through a marking device 10 for any reason, such as to receive a second image thereon (even on the same side thereof).

Disposed along the duplex path 24, in the particular illustrated embodiment, is what can generally be called an "inverter" 26. As is generally known in the art, the function of inverter 26 is in effect to flip over a particular sheet, so that a second side of the sheet can be re-fed to the marking device 10 for placing the second image thereon. The general architecture of a feed path and duplex path shown in the Figure is generally familiar from the Xerox® Document Centre™ 265, which became publicly available in 1997, although other architectures, such as including trays for temporarily storing sheets until they are re-fed, are known in the art.

With particular reference to the present invention, optical sensor 20 acts as an edge position detector for sheets approaching the marking device 10 through feed path 16, while optical sensor 22 acts as an edge position detector for sheets passing through duplex path 24. Sheets passing through duplex loop 24 are typically those sheets which have already been printed on one side thereof by marking device 10, and then inverted in inverter 26, to be sent back to marking device 10 through duplex path 24. Thus, in general, every sheet passing through duplex path 24 will already have thereon one image on a first side thereof, and is approaching marking device 10 to receive a second image on the second, opposite side thereof. A key function of the present invention is to ensure proper registration of the first image on the first side with the second image on the second side.

According to the present invention, the image placement controller 14 responds to signals from both optical detectors 20, 22, and uses this information to control the placement of images on sheets by marking device 10. There are several possible techniques that can be used by image placement controller to achieve registration between a first side image and a second side image on a single sheet. In the preferred embodiment of the invention, two types of image placement control occur: for sheets traveling through feed path 16, a running average of measurements of the location of the side edge for a set of sheets apparatus, such as a running average of the last three sheets, is maintained, and this running average is used to control the placement of images on a subsequent sheet at any particular time. Further, the precise positions of side edges of sheets passing through duplex path 24 is measured by optical sensor 22 and reported to the image placement controller 14; again, a running average of the edge positions of previously-fed sheets can be used for controlling the placement of images on subsequent sheets passing through the duplex path 24. Further, and possibly in addition, by comparing the running averages of the side edge positions of sheets coming through feed path 16 and duplex path 24, a "shift factor," meaning a mathematical relationship between the relative positions of sheets coming through feed path 16 and the duplex path 24, can be obtained. It is often found that the passage of a sheet through duplex path 24 often results in a side-to-side shift of the sheets passing therethrough, and the shift is fairly consistent for all sheets going through the path in a particular machine. By taking this consistent shift, as symbolized by the calculated shift factor, into account while the printer is running, the image placement controller 14 can control the marking device 10 to ensure registration of the first side image with the second side image on a single sheet.

Although the above-described system of maintaining running averages for the location of the side edges of sheets passing through both feed path 16 and the duplex path 24, and using the running averages to determine the placement of images on a subsequent sheets, is the currently preferred embodiment, other, more computationally sophisticated, techniques can be contemplated. For instance, if the computing power available to the printing apparatus is fast enough, a system can be provided in which for a single sheet, the precise location of the sheet is determined immediately before the sheet is fed into marking device 10, and marking device 10 is controlled to place an image with precision relative to the determined location of the side edge of the sheet; further, when a the same sheet is duplexed, the process can be repeated using the side edge location as determined from the sensor 22 in duplex path 24. Another variation is to use a precise measurement of the side edge location of the sheet being printed in combination with a derived shift factor as determined by the difference in average side edge locations in the feed path 16 and duplex path 24.

Figure 3:
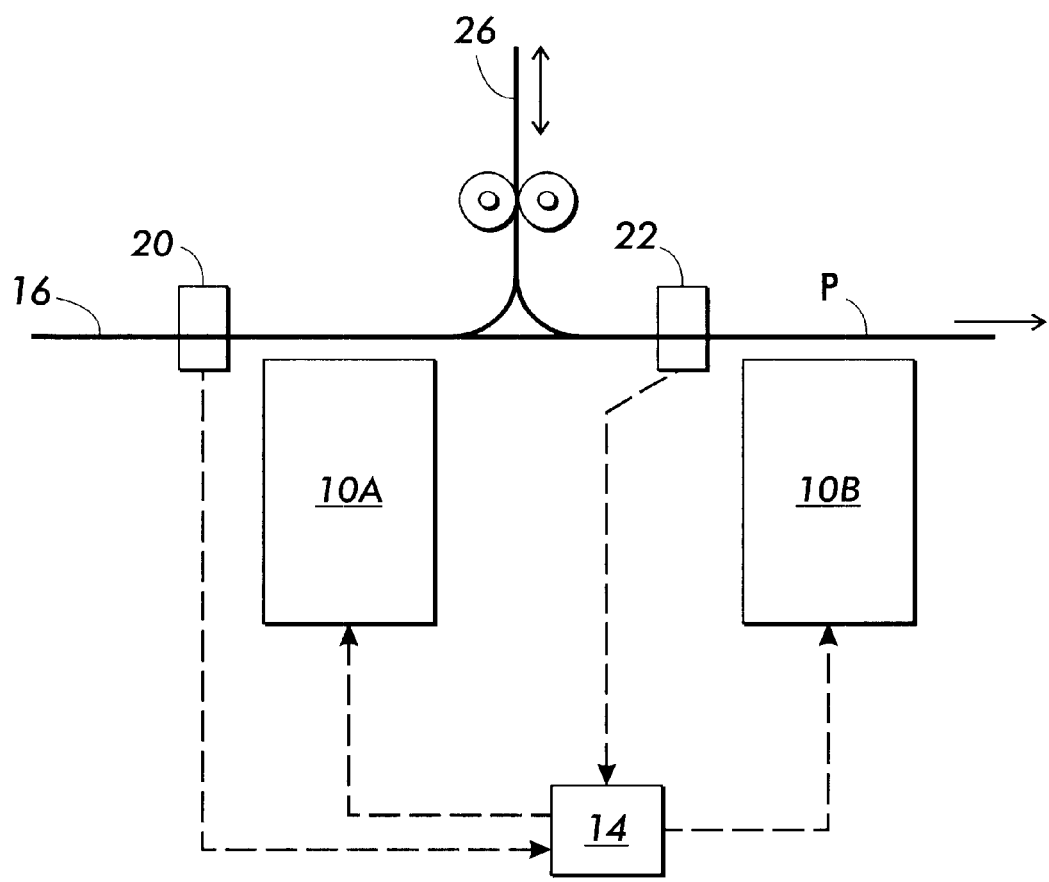
FIG. 3 is a simplified elevational view of a digital printing apparatus having multiple marking devices therein, incorporating an alternate embodiment of the present invention.

Although the various techniques of measurement and image position control shown in FIG. 2 are useful with a duplexing printing apparatus in which the same sheet is passed twice through a single marking device 10, many of the same principles of the invention can be applied to printing apparatus in which a sheet, even at the same side of the sheet, is caused to pass through multiple marking devices, such as in a color printing apparatus. FIG. 3 is a simplified elevational view of a portion of a printing apparatus having two different marking devices, indicated as 10A and 10B. In a practical embodiment, marking device 10A could for example place black marking material on a sheet, while marking device 10B places highlight color marking material, or MICR marking material, on the sheet. The apparatus could further include an inverter 26, which would function largely as in the FIG. 2 example, that is, to make a second side of a sheet available to marking device 10B, for duplex prints.

In the FIG. 3 printing apparatus, sensors 20 and 22 provide signals relating to the precise location of the side edges of sheets passing therethrough, and send these signals to image placement controller 14, which in turn controls image placement of both marking devices 10A and 10B. The same general principles as described above for operation of the image placement controller 14 with the duplex path can similarly be applied to the FIG. 3 apparatus. For instance, controller 14 can derive, based on running averages of the locations of side edges of sheets moving past sensor 20 and sensor 22, a shift factor describing a consistent side-to-side shift of sheets passing between the two sensors; there may well be different types of shift factors depending on whether converter 26 is being used or not, and controller 14 can take this into account. Alternately, controller 14 can detect, through sensor 20 the precise location of the side edge of a sheet 20 just as it is entering marking device 10A, use that information for precise placement of the image, and perform the same function with sensor 22 and marking device 10B.

What is claimed is:

1. A printing apparatus, comprising:

a marking device, the marking device being capable of placing an image on a sheet fed therein, and outputting the sheet;

a feed path, for feeding a sheet from a sheet supply to the marking device;

a duplex path, by which a sheet output from the marking device is re-fed to the marking device;

a first edge position detector, for outputting a first edge position signal relating to a location of a side edge of a sheet passing through the feed path;

a second edge position detector, for outputting a second edge position signal relating to a location of a side edge of a sheet passing through the duplex path; and an image placement controller associated with the marking device, the image placement controller adjusting placement of an image on the sheet in response to at least one of the first edge position signal and the second edge position signal.

2. The apparatus of claim 1, the image placement controller adjusting placement of an image on the sheet in response to the first edge position signal and the second edge position signal.

3. The apparatus of claim 1, the image placement controller retaining first edge position signals for a plurality of sheets passing through the feed path and adjusting placement of an image on a subsequent sheet in the feed path based on the retained first edge position signals.

4. The apparatus of claim 3, the image placement controller retaining first edge position signals for a plurality of sheets passing through the feed path and adjusting placement of an image on a subsequent sheet in the feed path based on an average of the retained first edge position signals.

5. The apparatus of claim 1, the image placement controller retaining second edge position signals for a plurality of sheets passing through the duplex path and adjusting placement of an image on a subsequent sheet in the duplex path based on the retained second edge position signals.

6. The apparatus of claim 5, the image placement controller retaining second edge position signals for a plurality of sheets passing through the duplex path and adjusting placement of an image on a subsequent sheet in the duplex path based on an average of the retained second edge position signals.

7. The apparatus of claim 1, the image placement controller retaining first edge position signals for a plurality of sheets passing through the feed path and second edge position signals for a plurality of sheets passing through the duplex path, and determining a shift factor, the shift factor relating to a shift in an edge position associated with at least a portion of the duplex path, and adjusting placement of an image on a subsequent sheet in the duplex path based at least in part on the shift factor.

8. The apparatus of claim 1, the duplex path including means for inverting a sheet output by the marking device before re-feeding the sheet to the marking device.

9. The apparatus of claim 1, the marking device including a charge receptor.

10. The apparatus of claim 1, the marking device including an ink-jet printhead.

11. A printing apparatus, comprising:
a first marking device, the marking device being capable of placing an image on a sheet fed therein, and outputting the sheet;
a second marking device, the marking device being capable of placing an image on a sheet fed therein, and outputting the sheet;
a feed path, for feeding a sheet from a sheet supply to the first marking device and then to the second marking device;
a first edge position detector, for outputting a first edge position signal relating to a location of a side edge of a sheet passing through the feed path before the first marking device;
a second edge position detector, for outputting a second edge position signal relating to a location of a side edge of a sheet passing through the feed path before the second marking device; and
an image placement controller associated with at least one marking device, the image placement controller adjusting placement of an image on the sheet in response to at least one of the first edge position signal and the second edge position signal.

12. The apparatus of claim 11, the image placement controller adjusting placement of an image on the sheet in response to the first edge position signal and the second edge position signal.

13. The apparatus of claim 11, the image placement controller retaining first edge position signals for a plurality of sheets passing through the feed path and adjusting placement of an image on a subsequent sheet in the feed path based on the retained first edge position signals.

14. The apparatus of claim 13, the image placement controller retaining first edge position signals for a plurality of sheets passing through the feed path and adjusting placement of an image on a subsequent sheet in the feed path based on an average of the retained first edge position signals.

15. The apparatus of claim 11, the image placement controller retaining second edge position signals for a plurality of sheets passing through the feed path and adjusting placement of an image on a subsequent sheet in the feed path based on the retained second edge position signals.

16. The apparatus of claim 15, the image placement controller retaining second edge position signals for a plurality of sheets passing through the duplex path and adjusting placement of an image on a subsequent sheet in the duplex path based on an average of the retained second edge position signals.

17. The apparatus of claim 11, the image placement controller retaining first edge position signals and second edge position signals for a plurality of sheets passing through the feed path, and determining a shift factor, the shift factor relating to a shift in an edge position associated with at least a portion of the feed path, and adjusting placement of an image on a subsequent sheet in the feed path based at least in part on the shift factor.

18. The apparatus of claim 11, the feed path including an inverter for inverting a sheet output by the first marking device before feeding the sheet to the second marking device.

19. The apparatus of claim 11, at least one marking device including a charge receptor.

20. The apparatus of claim 11, at least one marking device including an inkjet printhead.

* * * * *